(12) United States Patent
Coates et al.

(10) Patent No.: US 8,222,924 B2
(45) Date of Patent: Jul. 17, 2012

(54) ASYNCHRONOUS FIFO CIRCUIT FOR LONG-DISTANCE ON-CHIP COMMUNICATION

(75) Inventors: William S. Coates, Los Gatos, CA (US); Robert J. Drost, Los Altos, CA (US); Josephus C. Ebergen, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 0 days.

(21) Appl. No.: 12/954,474

(22) Filed: Nov. 24, 2010

(65) Prior Publication Data
US 2012/0128037 A1    May 24, 2012

(51) Int. Cl.
*G06F 7/38* (2006.01)
*H03K 19/173* (2006.01)
(52) U.S. Cl. .......................................... 326/46; 370/492
(58) Field of Classification Search .................. None
See application file for complete search history.

(56) References Cited

U.S. PATENT DOCUMENTS

| | | | |
|---|---|---|---|
| 7,453,882 B2 * | 11/2008 | Ho et al. | 370/395.1 |
| 2003/0201797 A1 * | 10/2003 | Ebergen | 326/95 |
| 2009/0067451 A1 * | 3/2009 | Cotton et al. | 370/492 |

* cited by examiner

*Primary Examiner* — Shawki Ismail
*Assistant Examiner* — Crystal L Hammond
(74) *Attorney, Agent, or Firm* — Park, Vaughan, Fleming & Dowler LLP; Chia-Hsin Suen

(57) ABSTRACT

The disclosed embodiments provide a first-in, first-out (FIFO) circuit that operates asynchronously. The FIFO circuit includes a data path that contains data latches sequentially connected through data-wire segments. The FIFO circuit also includes a control circuit that generates control signals for the data latches so that the data path behaves like a FIFO. The control circuit includes control components sequentially connected to each other through control-wire segments and repeaters located within the control-wire segments. The control components are configured to asynchronously generate the control signals for the data latches, and the repeaters are configured to repeat asynchronous signals communicated between the asynchronous control components.

20 Claims, 5 Drawing Sheets

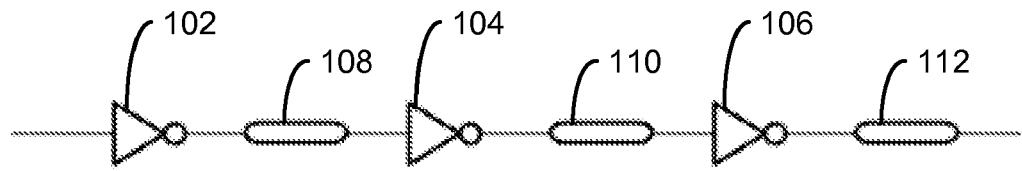
FIG. 1A
(Prior Art)
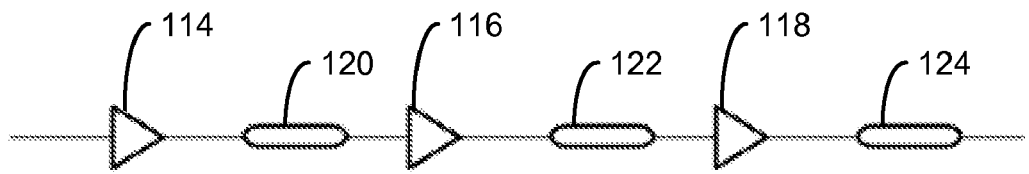
FIG. 1B
(Prior Art)
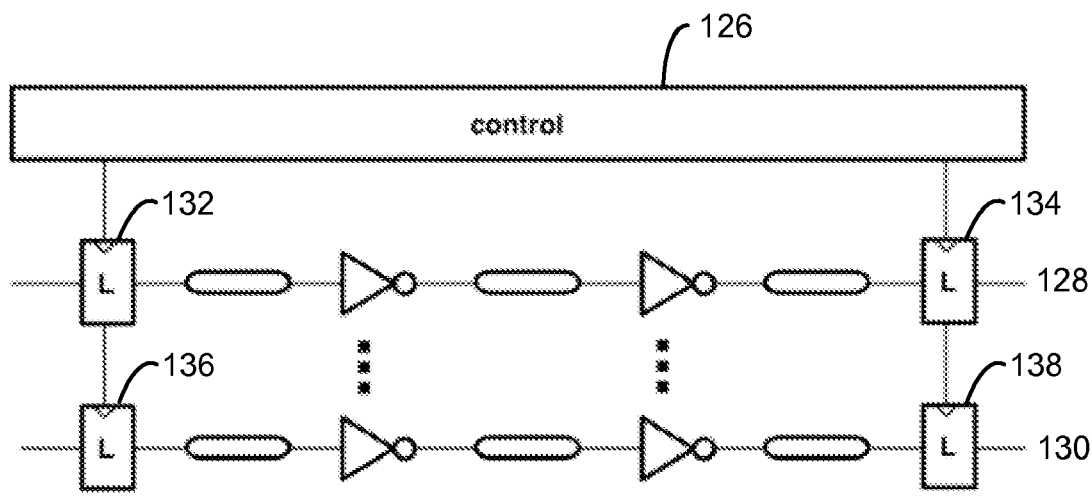
FIG. 1C
(Prior Art)

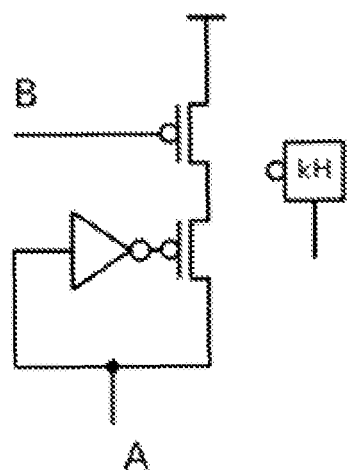
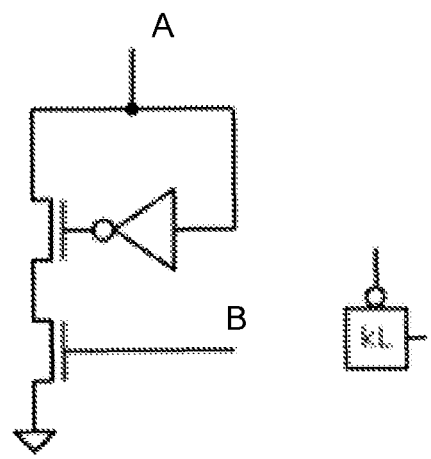
FIG. 4A   FIG. 4B
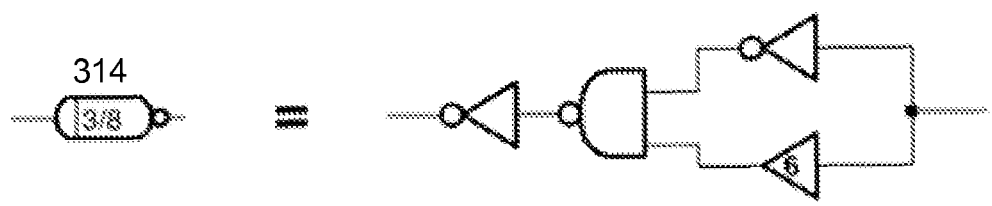
FIG. 5

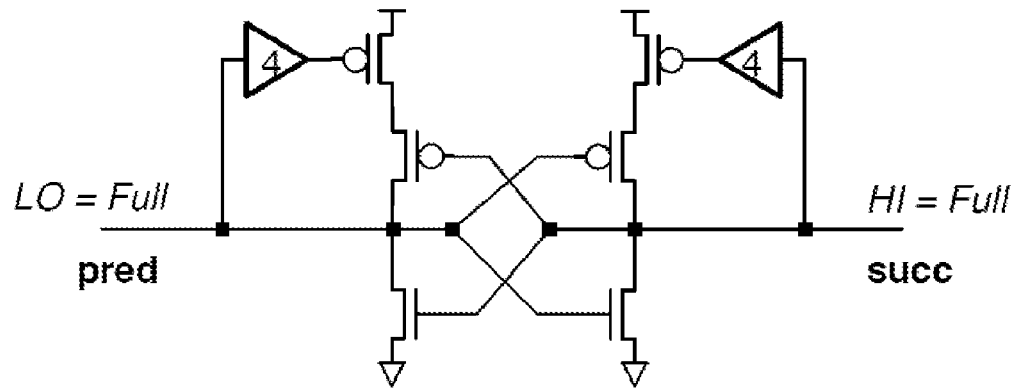
FIG. 6A
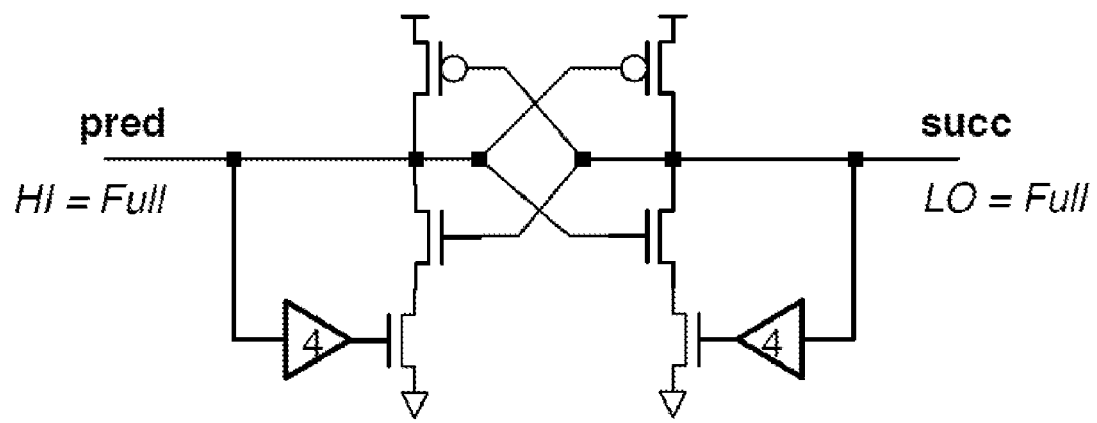
FIG. 6B
$$pred \downarrow \xrightarrow{1} succ \uparrow \xrightarrow{\geq 5} succ \downarrow \xrightarrow{1} pred \uparrow$$
FIG. 6C

ASYNCHRONOUS FIFO CIRCUIT FOR LONG-DISTANCE ON-CHIP COMMUNICATION

BACKGROUND

1. Field

The present embodiments relate to techniques for communicating data over long distances on-chip. More specifically, the present embodiments relate to techniques for facilitating long-distance on-chip communication using first-in, first-out (FIFO) structures.

2. Related Art

Dramatic increases in computational speed in recent years have largely been facilitated by improvements in semiconductor integration densities, which presently allow hundreds of millions of transistors to be integrated into a single semiconductor chip. This makes it possible to incorporate a large amount of computational circuitry onto a semiconductor chip. Moreover, the small circuit dimensions made possible by improved integration densities have enabled this computational circuitry to operate at greatly increased speeds.

While computational circuitry in semiconductor chips continues to increase in speed, the delay involved in communicating data between semiconductor chips has not decreased significantly. Put another way, continuing reductions in integrated circuit size and speed have increased the relative resistances and latencies of on-chip wires. For example, the resistive-capacitive (RC) delay of a long wire connecting two processor cores may be hundreds of times higher than a gate delay in each processor core. Consequently, communication delay is often the bottleneck in computer system performance.

To mitigate latency in long on-chip wires, a data path for communicating over long distances may utilize a repeated wire containing inverters 102-106 sequentially connected through long-wire segments 108-112, as shown in FIG. 1A. Alternatively, the data path may utilize buffers 114-118 connected through long-wire segments 120-124, as shown in FIG. 1B. Each buffer 114-118 may be implemented by concatenating two inverters, such as inverters 102-106. In addition, the sizes of inverters 102-106 and buffers 114-118 and the lengths of wire segments 108-112 and 120-124 may be selected to minimize the total forward latency and/or energy for a given distance in a particular technology.

To improve both latency and throughput in long wires, a control circuit 126 may be used to propagate data along a data path containing a number of repeated wires 128-130, as shown in FIG. 1C. Latches 132-138 in repeated wires 128-130 are used by control circuit 126 to store data as the data is transmitted along the data path.

Moreover, control circuit 126 may operate synchronously or asynchronously. In clocked (e.g., synchronous) circuits, the clock period is defined globally, and the delay of the repeated wire has to be less than the clock period minus some margin. Consequently, the locations of latches 132-138 may be restricted by both the area of the chip and the distance over which the data can travel on the data path during a clock cycle. Moreover, generation of a clock signal at an appropriate frequency for transmitting the data may add to the complexity of control circuit 126 and require synchronization interfaces at the ends of the data path.

On the other hand, the lack of a clock signal in an asynchronous design may allow control circuit 126 and the data path to be designed to match each other's forward latency. The forward latency of control circuit 126 may also be chosen independently of the cycle time of the producer or consumer of data items, as long as the sum of the forward and reverse latency is at most the cycle time of the producer or consumer. Asynchronous control of long wires may additionally allow components connected by the long wires to execute at different frequencies. Consequently, long-distance on-chip communication may be facilitated by mechanisms that asynchronously control the transmission of data over on-chip wires.

SUMMARY

The disclosed embodiments provide a first-in, first-out (FIFO) circuit that operates asynchronously. The FIFO circuit includes a data path that contains data latches sequentially connected through data-wire segments. The FIFO circuit also includes a control circuit that generates control signals for the data latches so that the data path behaves like a FIFO. The control circuit includes control components sequentially connected to each other through control-wire segments. The control circuit also includes repeaters located within the control-wire segments. The control components are configured to asynchronously generate the control signals for the data latches, and the repeaters are configured to repeat asynchronous signals communicated between the asynchronous control components.

In some embodiments, a given data-wire segment in the data path includes one or more repeaters.

In some embodiments, a given control component and a successive repeater component in the control circuit collectively implement a GasP module.

In some embodiments, the given control component corresponds to a GasP AND circuit, and the successive repeater component corresponds to a GasP repeater circuit.

In some embodiments, the GasP AND circuit and the GasP repeater circuit each have a forward latency of one gate delay.

In some embodiments, the GasP repeater circuit has a reverse latency of one gate delay.

In some embodiments, the GasP repeater circuit includes a pair of cross-coupled inverters and a delay mechanism configured to stop an output of the GasP repeater circuit after five gate delays.

BRIEF DESCRIPTION OF THE FIGURES

FIG. 1A shows a repeated wire for transmitting data over long distances.

FIG. 1B shows a repeated wire for transmitting data over long distances.

FIG. 1C shows a system for asynchronously transmitting data over a long wire.

FIG. 4A shows a keeper circuit in accordance with an embodiment.

FIG. 4B shows a keeper circuit in accordance with an embodiment.

FIG. 5 shows a pulse generator circuit in accordance with an embodiment.

FIG. 6A shows a GasP repeater circuit in accordance with an embodiment.

FIG. 6B shows another implementation of a GasP repeater circuit in accordance with an embodiment.

FIG. 6C shows the behavior of a GasP inverter circuit in accordance with an embodiment.

In the figures, like reference numerals refer to the same figure elements.

DETAILED DESCRIPTION

Figure 2A:
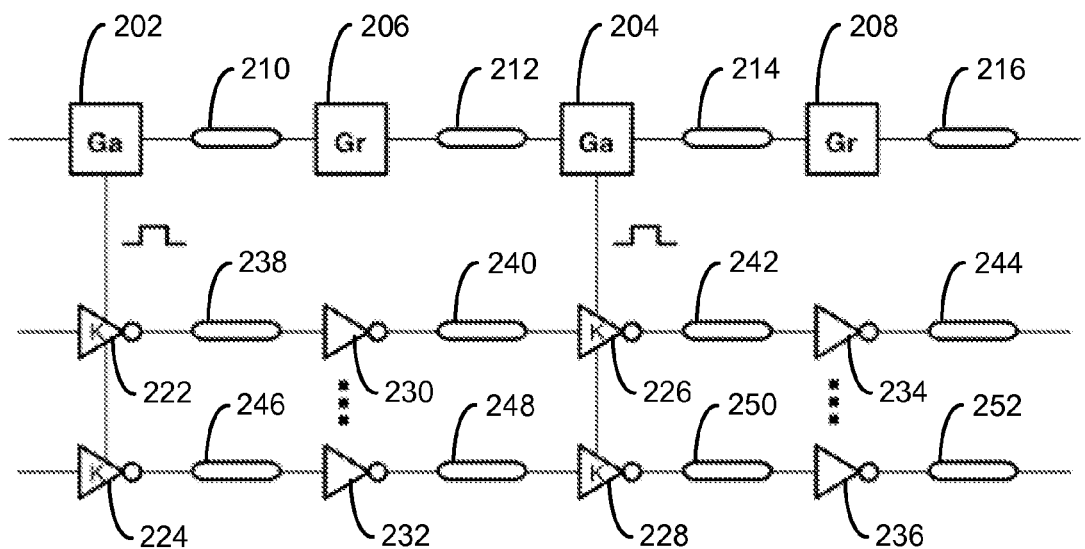
FIG. 2A shows a FIFO circuit that operates asynchronously in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Data used in long-distance on-chip communication is normally transmitted over repeated wires as shown in FIGS. 1A-1B. FIG. 1A shows a repeated wire with inverters 102-106, while FIG. 1B shows a repeated wire with buffers 114-118, where a buffer is a concatenation of two inverters. Long distance on-chip communication incurs significant latency and is typically the bottleneck for improving performance. We present a method for communicating data over long on-chip distances at latencies as fast as repeated wires.

In the past, many techniques have been proposed to achieve low-latency long-distance communication. Examples of these techniques include differential signal and low-swing signaling. Furthermore, these circuit techniques focus on speeding up the propagation of the data rather than the control of the data. In accordance with the present embodiments, we focus on the circuitry to control the propagation of the data. The control circuitry dictates when and which data storage elements must refresh their data. The data storage elements may be latches and/or flip-flops. An exemplary configuration of control and data path is shown in FIG. 1C.

In particular, we would like to design a control circuit 126 that controls the data propagation in repeated wires 128-130 so that repeated wires 128-130 behave as a FIFO. This means that multiple data items can be in-flight without data items overwriting each other, and no overflow and/or underflow can occur as long as the timing constraints are satisfied. Furthermore, we would like the forward latency in control circuit 126 to be the same as the forward latency over two repeated segments, (i.e., about 2 gate delays plus any wire delays and a latch setup). Finally, the cycle time of the FIFO control circuit 126 must be at least as short as the shortest cycle time of a clocked circuit that produces or consumes the data for this FIFO.

Asynchronous control circuits for FIFOs come in different shapes and forms. By achieving a forward latency of two gate delays, GasP modules are among the most energy efficient and fastest of such asynchronous control circuits. However, conventional GasP modules cannot be decoupled such that components of one gate delay can be connected with long wires to cover long distances. The GasP circuits described below can easily be coupled into components of one gate delay and connected with longer wires while still providing a short forward latency.

FIG. 2A shows a FIFO circuit that operates asynchronously in accordance with an embodiment. The FIFO circuit of FIG. 2A includes two GasP AND circuits 202-204 (e.g., "Ga") and two GasP repeater circuits 206-208 (e.g., "Gr").

The FIFO circuit also includes bidirectional tri-state control-wire segments 210-216 that sequentially connect GasP AND circuits 202-204 and GasP repeater circuits 206-208. Furthermore, GasP AND circuits 202-204 and GasP repeater circuits 206-208 may implement a control circuit that provides asynchronous control of a data path containing one or more repeated wires. As discussed below, the FIFO circuit may facilitate communication over long on-chip wires by propagating data along the data path at latencies that match those of repeated wires.

In one or more embodiments, GasP AND circuits 202-204 and GasP repeater circuits 206-208 generate control signals for data latches in the data path so that the data path behaves like a FIFO. Each stage of the FIFO may contain one GasP AND circuit and one or more GasP repeater circuits. For example, GasP AND circuit 202 and GasP repeater circuit 206 may be connected through control-wire segments 210-212 to form one stage of the FIFO, and GasP AND circuit 204 and GasP repeater circuit 208 may be connected through control-wire segments 214-216 to form a successive second stage of the FIFO.

Within each stage of the FIFO, a GasP AND circuit and successive GasP repeater circuit may collectively implement a GasP module. In particular, the GasP AND circuit may correspond to a control component that asynchronously generates control signals to drive a data latch in the data path so that the data path behaves like a FIFO. The successive GasP repeater circuit may correspond to a repeater component that repeats asynchronous signals communicated between the GasP module and adjacent GasP modules. GasP AND circuits are discussed in further detail below with respect to FIGS. 3A-3C, and GasP repeater circuits are discussed in further detail below with respect to FIGS. 6A-6B.

In one or more embodiments, GasP AND circuits 202-204 and GasP repeater circuits 206-208 each have a forward latency of one gate delay, which matches the forward latency of the data path (e.g., one gate delay from each inverter). Each GasP repeater circuit may also have a reverse latency of one gate delay, while each GasP AND circuit may have a reverse latency of at least 9 gate delays. Because the cycle time of the control circuit is around 12 gate delays, the FIFO circuit may operate faster than a synchronous FIFO circuit with a typical clock cycle time of 16-40 gate delays. As a result, the FIFO circuit may be embedded in a synchronous system to facilitate long-distance on-chip communication between components in the synchronous system.

Figure 2B:
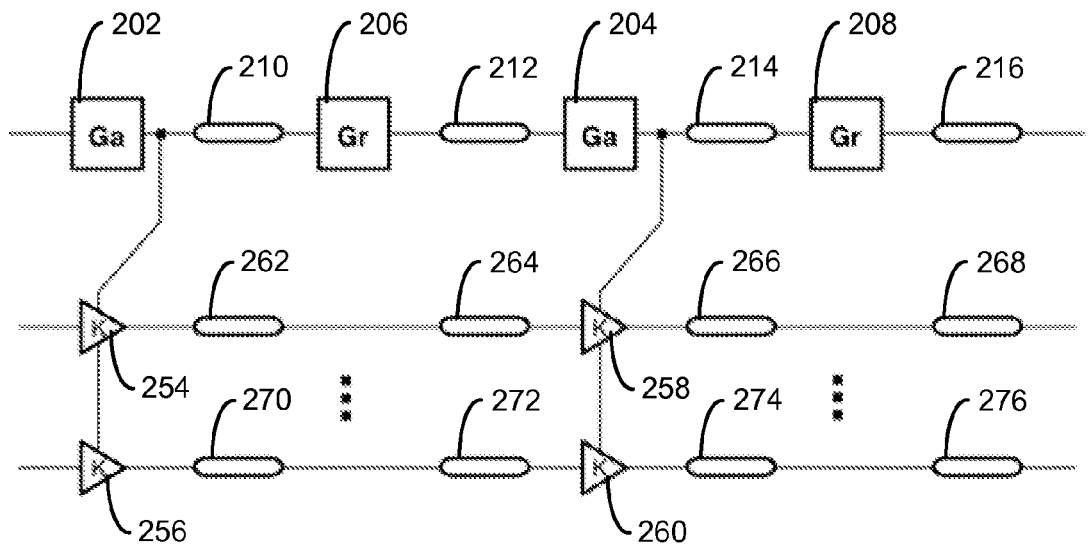
FIG. 2B shows a FIFO circuit that operates asynchronously in accordance with an embodiment.

As shown in FIG. 2A, GasP AND circuits 202-204 propagate data through the data path by generating pulses (e.g., five-gate-delay pulses) that drive latches 222-228 (e.g., "K") connected through data-wire segments 238-252 in the data path. Repeaters 230-236 may also be placed in between data latches 222-228 to propagate the values stored in latches 222-228 along the data path. Alternatively, as shown in FIG. 2B, GasP AND circuits 202-204 may control data latches 254-260 using state wires that transmit asynchronous signals from control-wire segments 210-216 in the control circuit. In both cases, the latch may be assumed to be transparent when the control input is HI.

In one or more embodiments, latches 222-228 correspond to tri-state inverters with keeper circuits, while latches 254-260 correspond to buffers with keeper circuits. Thus, latches 254-260 may have twice the latency of latches 222-228 if each latch 254-260 is implemented by concatenating two inverters of the same size as the single inverter in each latch 222-228. However, the absence of repeaters along data-wire segments 262-276 connecting latches 254-260 may increase the overall latency of the data path in FIG. 2B compared to the latency of the data path in FIG. 2A.

In addition, the FIFO circuit may utilize different combinations of control-signaling mechanisms (e.g., between the GasP AND circuits and latches) and data-propagation mechanisms (e.g., along the data path). For example, the FIFO circuit may generate pulses to drive buffer-based data latches (e.g., latches 254-260), or the FIFO circuit may drive inverter-based data latches (e.g., latches 222-228) using state wires that transmit asynchronous signals communicated between GasP AND circuits 202-204 and GasP repeater circuits 206-208.

In one or more embodiments, each GasP AND circuit 202-204 implements the data movements between two FIFO stages: the GasP AND circuit fires when the predecessor stage is full and the successive stage is empty. The firing causes the predecessor stage to become empty and the successive stage to become full. The firing may also drive the control input of the corresponding latch HI and cause the latch to become transparent.

In other words, GasP AND circuits 202-204 only generate control signals in the data path if and when data items must move in the data path. Furthermore, selective generation of control signals in the control circuit may represent a power savings over synchronous control circuits that continue to generate clock cycles regardless of the presence or absence of data in the data path.

Figure 3A:
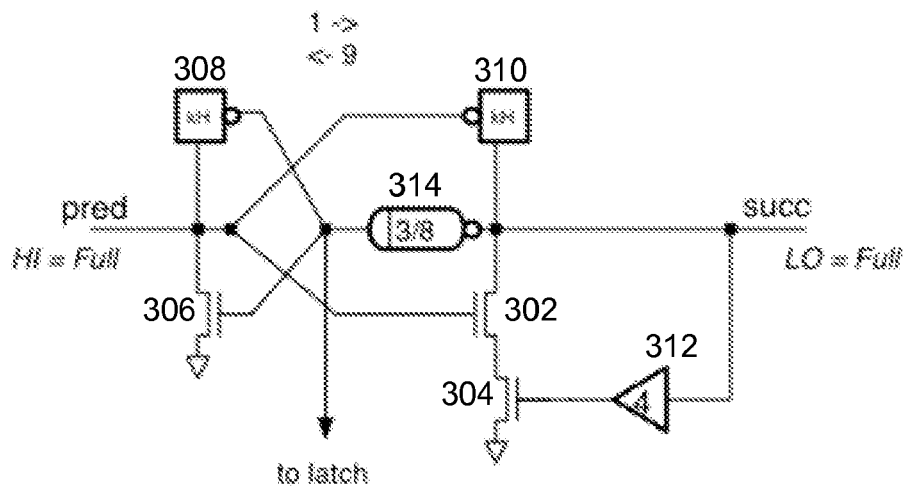
FIG. 3A shows a GasP AND circuit in accordance with an embodiment.

FIG. 3A shows a GasP AND circuit in accordance with an embodiment. As shown in FIG. 3A, the GasP AND circuit may use a stack of two n-channel metal-oxide-semiconductor (NMOS) transistors 302-304 to perform a logical AND operation. In particular, firing of transistors 302-304 may be triggered when the predecessor (e.g., "pred") and successive (e.g., "succ") stages are both HI. The successive stage becomes full (e.g., LO) after a four-gate-delay buffer 312 in a feedback loop from the successive stage causes transistors 302-304 to stop driving the successive wire HI after five gate delays The low transition at the input of a pulse generator 314 (e.g., "⅜") then causes pulse generator 314 to generate a positive pulse after three gate delays. The pulse is five gate delays wide and is applied to the gate of a single NMOS transistor 306, thereby causing the predecessor stage to become empty (e.g., LO). Keepers 308-310 labeled "kH" keep the predecessor and successive wires HI when enabled. For example, keepers 308-310 may keep the respective predecessor and successive wires high even after the wires are no longer driven high. Keepers 308-310 are discussed below with respect to FIGS. 4A-4B.

As with previous GasP implementations, each gate in the GasP AND circuit may be assumed to have the same gate delay. Such an assumption may be implemented by proper gate sizing. In particular, the latency of each gate in the FIFO circuit may be based on the gate delay of a single-stage gate selected by the designer. More specifically, the GasP AND circuit may be constructed so that transistors 302-306 and keepers 308-310 have the same latency as the single-stage gate (e.g., one gate delay), pulse generator 314 has three times the latency of the single-stage gate (e.g., three gate delays), and buffer 312 has four times the latency of the single-stage gate (e.g., four gate delays). Along the same lines, buffer 312 may be implemented using four inverters of one gate delay each or two larger inverters of two gate delays each.

In other words, a numeric value within a gate may denote the gate delay of the gate relative to other gates in the circuit. As a result, the GasP AND circuit of FIG. 3A may have a forward latency of one gate delay from the stack of NMOS transistors 302-304. On the other hand, the GasP AND circuit may have a reverse latency of nine gate delays: four gate delays through buffer 312, one gate delay through transistors 302-304, three gate delays through pulse generator 314, and one gate delay through transistor 306.

Figure 3B:
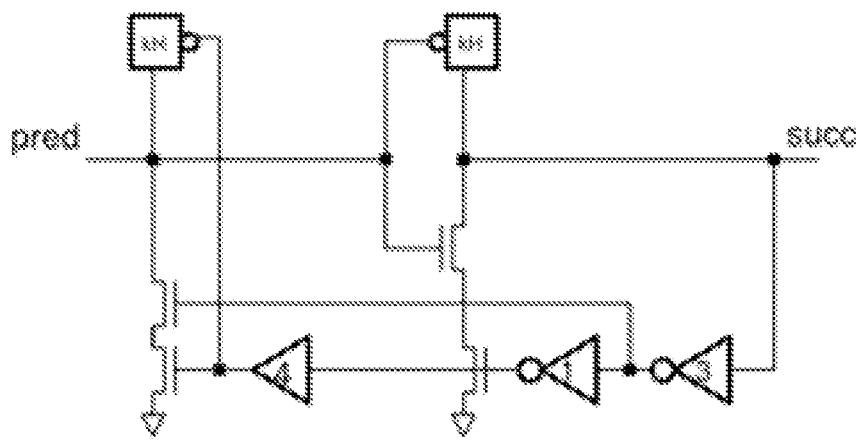
FIG. 3B shows a GasP AND circuit in accordance with an embodiment.
Figure 3C:
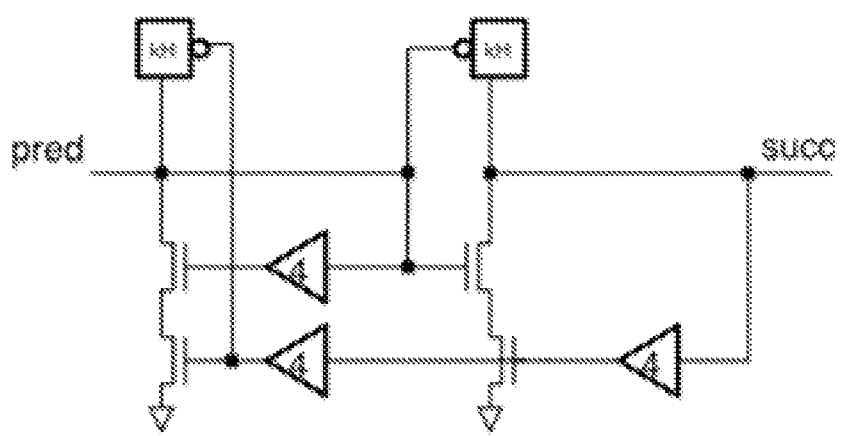
FIG. 3C shows a GasP AND circuit in accordance with an embodiment.

Alternative implementations of the GasP AND circuit are shown in FIGS. 3B-3C. In these implementations we have omitted the pulse generator that generates pulses for the latches in the data path. Such a pulse generator may be connected to the wire labeled "succ". Note that the pulse generator must generate a pulse for each falling transition on the wire "succ".

FIG. 4A shows a keeper circuit for keepers 308-310 in accordance with an embodiment. The keeper circuit is labeled "kH" and is designed to keep node A HI as long as node B is LO. When node B is HI, the keeper circuit is disabled. The keeper circuit (e.g., "kL") of FIG. 4B operates in a similar fashion, but keeps node A LO as long as node B is LO.

FIG. 5 shows a pulse generator circuit for pulse generator 314 in accordance with an embodiment. Three gate delays after a falling transition arrives at the input of the pulse generator circuit, the pulse generator circuit produces a rising pulse with a length of five gate delays at its output.

FIG. 6A shows a GasP repeater circuit in accordance with an embodiment. The GasP repeater circuit includes a pair of cross-coupled inverters and a delay mechanism that stops the output of the GasP repeater after five gate delays. For example, a LO from the predecessor stage may cause the GasP repeater circuit to drive the successive stage HI for five gate delays and then stop. Then, after the successive wire is pulled LO, the GasP repeater circuit may drive the predecessor stage HI for five gate delays.

FIG. 6B shows another implementation of a GasP repeater circuit. This GasP repeater circuit is similar to the repeater circuit illustrated in FIG. 6B, except that the polarity of this repeater circuit is reversed. Hence in this implementation, a HI from the predecessor stage may cause the GasP repeater circuit to drive the successive stage LO for five gate delays and then stop. Then, after the successive wire is pulled HI, the GasP repeater circuit may drive the predecessor stage LO for five gate delays.

More specifically, the behavior of the GasP repeater circuit in the FIFO control circuit is shown in FIG. 6C, with up and down arrows representing rising and falling transitions in the corresponding stages of the FIFO. When the predecessor wire goes LO, the successive wire goes HI after one gate delay. After a delay of at least five gate delays, the successive wire may go LO. Then, after one gate delay, the predecessor wire goes HI. This behavior may repeat after a delay of at least five gate delays. Note that as long as the successive wire is HI, the predecessor wire is actively driven or kept LO. Similarly, as long as the predecessor wire is HI, the successive wire is actively driven or kept LO.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A first-in, first-out (FIFO) circuit that operates asynchronously, comprising:
   a data path comprising data latches sequentially connected through data-wire segments; and
   a control circuit configured to generate control signals for the data latches, comprising:

control components sequentially connected to each other through control-wire segments, wherein the control components are configured to asynchronously generate the control signals for the data latches; and repeaters located within the control-wire segments, wherein the repeaters are configured to repeat asynchronous signals communicated between the asynchronous control components, and wherein each repeater receives on a control-wire for a predecessor stage for the repeater a signal from the predecessor stage to cause the repeater to drive a control-wire for a successive stage for the repeater for a predetermined delay and then stop, and, after stopping, the repeater receives on the control-wire for the successive stage a signal to cause the repeater to drive on the control-wire for the predecessor stage a signal for predecessor stage;

wherein the control circuit is configured to generate the control signals so that the data path behaves as a FIFO.

2. The FIFO circuit of claim 1, wherein a given data-wire segment in the data path comprises one or more repeaters.

3. The FIFO circuit of claim 1, wherein a given control component and a successive repeater component in the control circuit collectively implement a GasP module.

4. The FIFO circuit of claim 3,
wherein the given control component corresponds to a GasP AND circuit, and
wherein the successive repeater component corresponds to a GasP repeater circuit.

5. The FIFO circuit of claim 4, wherein the GasP AND circuit and the GasP repeater circuit each have a forward latency of one gate delay.

6. The FIFO circuit of claim 5, wherein the GasP repeater circuit has a reverse latency of one gate delay.

7. The FIFO circuit of claim 4, wherein the GasP repeater circuit comprises:
a pair of cross-coupled inverters; and
a delay mechanism configured to stop an output of the GasP repeater circuit after five gate delays.

8. The FIFO circuit of claim 1, wherein the repeaters can include multiple repeaters coupled in succession between neighboring control components.

9. A method for asynchronously operating a first-in, first-out (FIFO) circuit, comprising:
using a control circuit to generate control signals for data latches sequentially connected through data-wire segments in a data path,
wherein the control circuit comprises:
control components sequentially connected to each other through control-wire segments, wherein the control components are configured to asynchronously generate the control signals for the data latches; and
repeaters located within the control-wire segments, wherein the repeaters are configured to repeat asynchronous signals communicated between the asynchronous control components, and wherein each repeater receives on a control-wire for a predecessor stage for the repeater a signal from the predecessor stage to cause the repeater to drive a control-wire for a successive stage for the repeater for a predetermined delay and then stop, and, after stopping, the repeater receives on the control-wire for the successive stage a signal to cause the repeater to drive on the control-wire for the predecessor stage a signal for predecessor stage;
wherein the control circuit is configured to generate the control signals so that the data path behaves as a FIFO.

10. The method of claim 9, wherein a given data-wire segment in the data path comprises one or more repeaters.

11. The method of claim 9, wherein a given control component and a successive repeater component in the control circuit collectively implement a GasP module.

12. The method of claim 11,
wherein the given control component corresponds to a GasP AND circuit, and
wherein the successive repeater component corresponds to a GasP repeater circuit.

13. The method of claim 12, wherein the GasP AND circuit and the GasP repeater circuit each have a forward latency of one gate delay.

14. The method of claim 13, wherein the GasP repeater circuit has a reverse latency of one gate delay.

15. The method of claim 12, wherein the GasP repeater circuit comprises:
a pair of cross-coupled inverters; and
a delay mechanism configured to stop an output of the GasP repeater circuit after five gate delays.

16. The method of claim 9, wherein the repeaters can include multiple repeaters coupled in succession between neighboring control components.

17. A computer system, comprising:
a processor;
a memory; and
a first-in, first-out (FIFO) circuit that operates asynchronously, comprising:
a data path comprising data latches sequentially connected through data-wire segments; and
a control circuit configured to generate control signals for the data latches, comprising:
control components sequentially connected to each other through control-wire segments, wherein the control components are configured to asynchronously generate the control signals for the data latches; and
repeaters located within the control-wire segments, wherein the repeaters are configured to repeat asynchronous signals communicated between the asynchronous control components, and wherein each repeater receives on a control-wire for a predecessor stage for the repeater a signal from the predecessor stage to cause the repeater to drive a control-wire for a successive stage for the repeater for a predetermined delay and then stop, and, after stopping, the repeater receives on the control-wire for the successive stage a signal to cause the repeater to drive on the control-wire for the predecessor stage a signal for predecessor stage;
wherein the control circuit is configured to generate the control signals so that the data path behaves as a FIFO.

18. The computer system of claim 17, wherein a given data-wire segment in the data path comprises one or more repeaters.

19. The computer system of claim 17, wherein a given control component and a successive repeater component in the control circuit collectively implement a GasP module.

20. The computer system of claim 17,
wherein the given control component corresponds to a GasP AND circuit, and
wherein the successive repeater component corresponds to a GasP repeater circuit.

* * * * *